Figure 1:
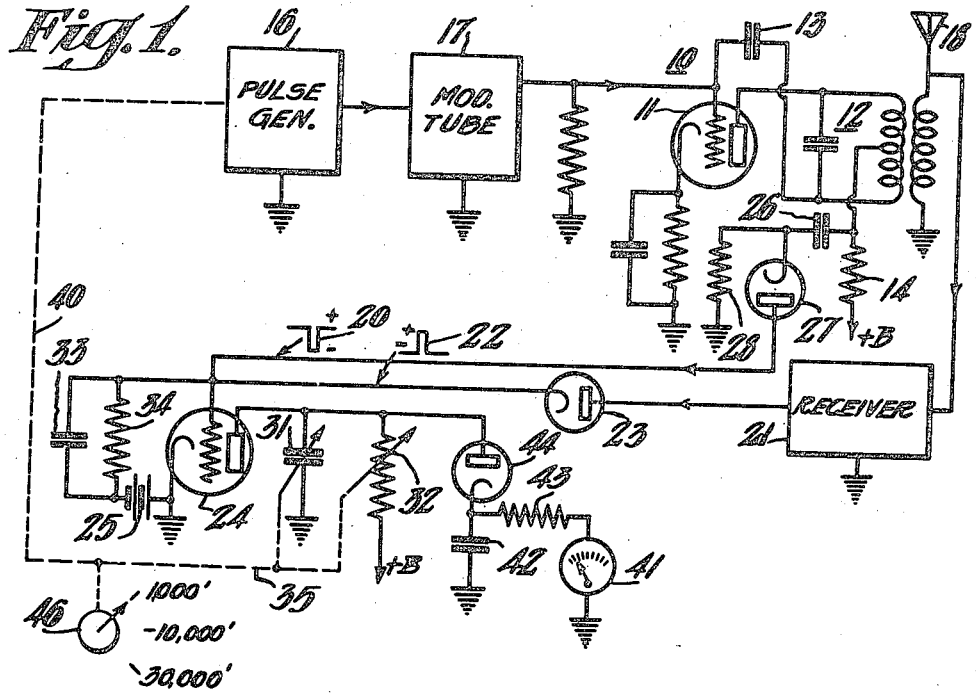

April 5, 1949.  J. EVANS  2,466,539
PULSE-ECHO DISTANCE INDICATOR
Filed Feb. 20, 1943  2 Sheets-Sheet 1

Inventor
John Evans
By
C. D. Tuska
Attorney

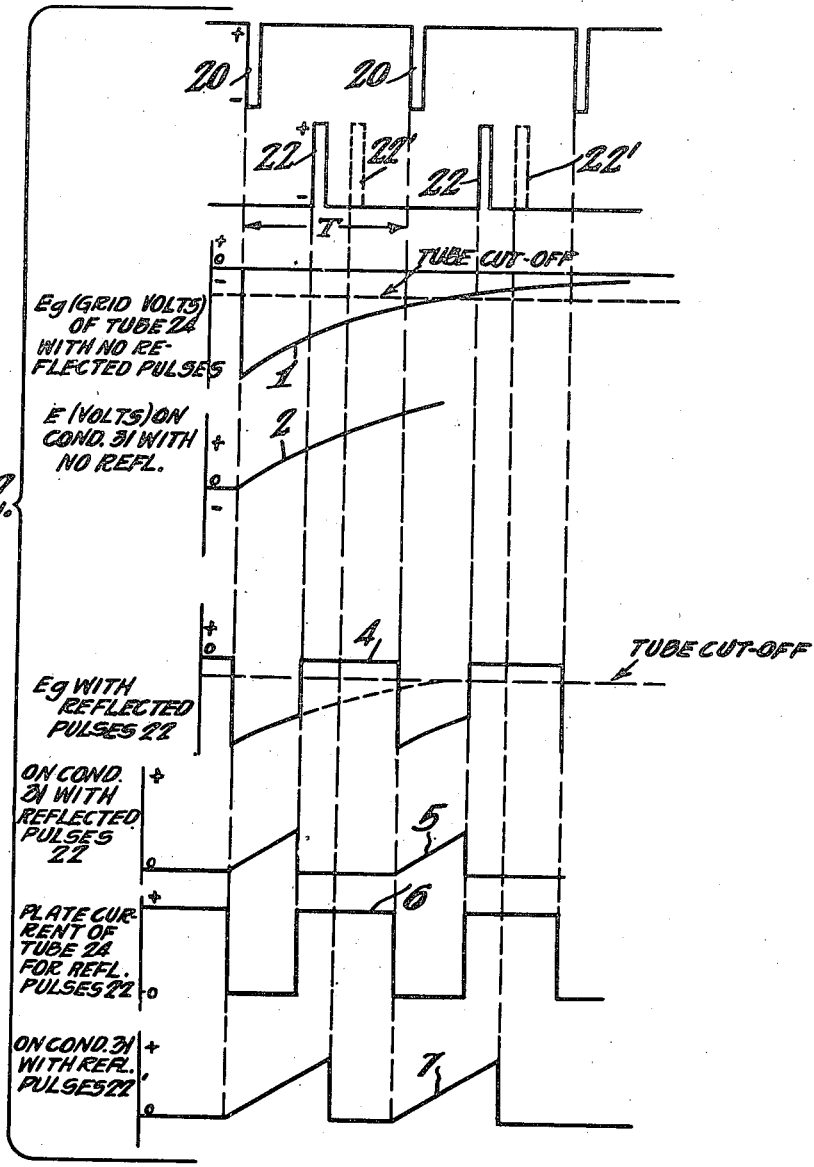

Patented Apr. 5, 1949

2,466,539

UNITED STATES PATENT OFFICE 2,466,539

PULSE-ECHO DISTANCE INDICATOR

John Evans, Kingston, N. J., assignor to Radio Corporation of America, a corporation of Delaware Application February 20, 1943, Serial No. 476,601

5 Claims. (Cl. 343—13)

My invention relates to object locating systems and particularly to pulse-echo systems for determining the distance to a reflecting object.

It is well known that the distance to an airplane, surface ship or other object can be found by transmitting pulses of energy (such as radio pulses), receiving the pulses after reflection from the object, and determining the time that elapsed between the transmission and the reception of the pulse. Since the propagation time of the radio wave is known, the distance to the reflecting object is a known function of this elapsed time.

An object of the present invention is to provide in a pulse-echo system an improved method of and means for measuring the time which elapses between the transmission of a pulse and the reception of the pulse after reflection from a reflecting object.

A further object of the invention is to provide an improved distance indicator for a pulse-echo system.

A still further object of the invention is to provide in a pulse-echo distance measuring system an improved method of and means for indicating the distance on a meter.

In a preferred embodiment of the invention the distance indicator comprises a timing capacitor which may be charged at a predetermined rate through a resistor and which may be discharged through a vacuum tube. The timing capacitor is charged through the resistor while the vacuum tube is held in a non-conducting condition. The vacuum tube is put in this condition by a negative pulse which is applied through a diode to the grid of the tube at the same time that a radio pulse is transmitted. The tube is held non-conducting by means of a resistor-capacitor biasing circuit until a reflected pulse is applied with positive polarity through a diode to the grid of the vacuum tube whereby the vacuum tube is rendered conducting to discharge the capacitor and bring its voltage back to a certain voltage level. Meanwhile, during the charging period of the timing capacitor, a meter control or storage capacitor has been charged through a diode by the timing capacitor voltage. Following the reflected pulse, the vacuum tube remains conducting because of resistor-capacitor biasing until the occurrence of the next transmitted pulse, and the timing capacitor receives no further charge until the occurrence of this next pulse which again drives the vacuum tube to a non-conducting condition.

Thus the meter control capacitor receives periodically a charge which has a value determined by the time interval between a transmitted pulse and the reflected pulse. A suitable meter is connected across the meter control capacitor through a resistor of such value as to permit the capacitor to discharge slowly through the meter to produce a continuous reading. The meter control capacitor can discharge only through the meter since the diode in the charging circuit will not conduct in the discharge direction.

Figure 3:
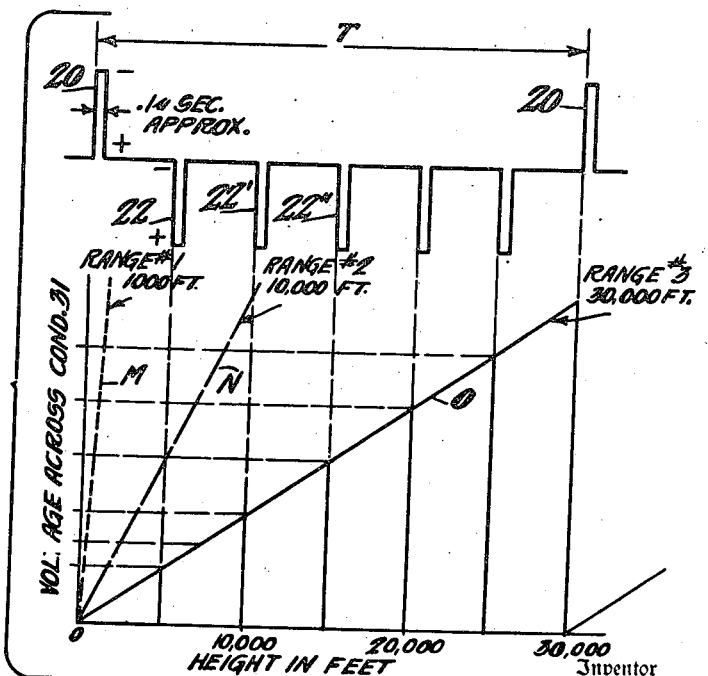
Figure 4:
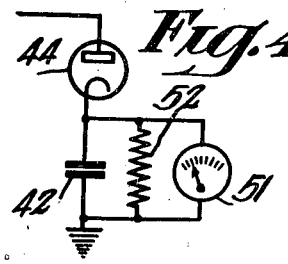

The invention will be better understood from the following description taken in connection with the accompanying drawing in which Figure 1 is a circuit diagram of one embodiment of the invention; Figure 2 is a group of graphs that are referred to in explaining the operation of the circuit of Fig. 1; Figure 3 is a group of graphs that are referred to in explaining the adjustment of the apparatus of Fig. 1 for the different range scales; and Figure 4 is a circuit diagram showing a modification of a portion of the circuit shown in Fig. 1. In the several figures similar parts are indicated by similar reference characters.

In Fig. 1 there is shown a radio altimeter or distance indicator comprising a radio-frequency oscillator 10 which may be of any suitable type. In the example shown it comprises a vacuum tube 11 having a tuned plate circuit 12 and a feed-back connection 13. Plate voltage is supplied through a resistor 14. The oscillator 10 is pulse modulated by periodically recurring rectangular pulses (recurring at a rate of 10 kc., for example) which are supplied from a source 16 and impressed upon the oscillator grid circuit through a modulator tube 17. Thus pulses of radio-frequency energy, shown at 20 in Fig. 2, are radiated from an antenna 18. The same antenna may be employed for reception, suitable protection (not shown) usually being provided to prevent the transmitted pulses from being applied with full strength to the receiver shown at 21.

The reflected pulses, shown in 22 in Figs. 1 and 2, after amplification and detection in the receiver 21 are applied with positive polarity through a diode 23 to the grid of a vacuum tube 24 which comprises a portion of the distance indicator circuit. Also, the transmitted pulses 20 are applied from the upper end of resistor 14 through a blocking capacitor 26 and a diode 27 to the grid of the tube 24, these pulses being applied with negative polarity. A resistor 28 may be provided to prevent a direct-current charge from building up on the blocking capacitor 26.

As will be explained below, the time difference between the negative pulses 20 and the positive pulses 22 determine the amount of charge that builds up on a capacitor 31 in the plate circuit of the tube 24.

The capacitor 31 receives a charging current through the plate resistor 32 of the tube 24 so long as the tube 24 is non-conducting. It is biased to a non-conducting condition by the negative blocking pulse 20, and a negative bias voltage of sufficient value to keep the tube non-conducting is held on the grid of tube 24 by a capacitor 33 which is connected between the grid and the cathode of tube 24. A grid-leak resistor 34 connected across the capacitor 33 permits the charge of this capacity to leak off slowly, the time constant of capacitor 33—resistor 34 being such that following a blocking pulse 20 the tube 24 will remain blocked until the next succeeding blocking pulse 20 occurs, unless the tube is unblocked sooner by a received pulse 22. The grid voltage on tube 24 is shown by the graph 1 of Fig. 2 for the condition of no received pulses, and the voltage across capacitor 31 is shown by the graph 2 for the same condition.

Upon the reception of a received pulse, the tube 24 is driven to a conducting condition by the positive pulse 22 whereby the capacitor 31 is discharged to substantially its previous voltage level. If desired, the grid of the tube 24 may be biased negatively by a biasing battery or other biasing source 25 by an amount sufficient to prevent the positive pulse 22 from causing grid current flow. However, it may be preferred to omit the biasing source 25 and connect the low end of the resistor 34 directly to the cathode of tube 24. Following the pulse 22, the grid bias of tube 24 remains such as to keep the tube conducting until the next transmitted pulse 20 occurs. This action is illustrated in Fig. 2 by the graph 4 showing the grid voltage of tube 24 and by the graph 5 showing the resulting voltage which builds up across the capacitor 31. Graph 6 of Fig. 2 shows the plate current flow in the tube 24 during the operation illustrated by the graphs 4 and 5.

If a reflected pulse is received at a later time, as indicated at 22' the capacitor 31 will be charged for a longer time and the voltage across it will be larger as shown by the graph 7 in Fig. 2. It is evident that the amplitude of the voltage appearing across capacitor 31 is a measure of the time that elapses between the transmission and the reception of a pulse. A continuous direct reading of this voltage may be obtained on a direct-current meter 41, such as a micro-ammeter, that is connected across a storage capacitor 42. This connection may be through a resistor 43 if the resistance of the meter itself is not high enough to insure a sufficiently slow discharge of the capacitor 42 through the meter.

The high potential side of storage capacitor 42 is connected through a diode 44 to the high potential side of the capacitor 31 whereby the capacitor 42 will be charged through diode 44 in accordance with the periodic sawtooth voltage pulses, such as shown in graphs 5 and 7 (Fig. 2), appearing across capacitor 31. It will be understood that the discharge time constant of the circuit 42—43—41 is slow compared with the time between successive voltage pulses applied thereto. It is evident that the storage capacitor 42 can discharge only through the meter 41 since the diode 44 is non-conducting in the discharge direction.

The meter 41, which preferably is calibrated to read directly in distance, will give a reading that is proportional to the voltage built up across the capacitor 42. If the time between the transmitted pulse and the reflected pulse increases, the voltage across capacitor 42 increases a corresponding amount; if this time decreases, the voltage across capacitor 42 decreases until the cathode of the diode 44 is below the anode potential of diode 44, at which time charging pulses from capacitor 31 will again be supplied to capacitor 42 to hold its voltage to a value corresponding to the changed time interval.

As illustrated in Fig. 1, the range scale may be changed by changing the time constant of the capacitor-resistor circuit 31—32. This may be done by changing the value of either capacitor 31 or resistor 32, or by changing the values of both. As indicated by the broken line 35, capacitor 31 and resistor 32 may be ganged for adjustment by a range switch 46. Also, as indicated by the broken line 40, the switch 46 may be connected to change simultaneously the repetition rate of the pulses from generator 16 when the range scale is changed.

The result of the change in range scale is shown in Fig. 3 where the graphs M, N and O represent the voltages that will build up across capacitor 31 for the three range scales indicated by the legends. Different received pulses are shown at 22, 22', etc. It will be apparent that by adjusting the time constant of 31—32 so that capacitor 31 charges comparatively rapidly as shown by graph M, for example, the voltage across capacitor 31 will be sufficient to give a good meter reading for pulses reflected over a short range.

From the foregoing it will be seen that one of the important advantages of my improved systems is that the meter 41 may be located where it can easily be read, since the leads from the meter to the capacitor 42 may be long. For example, it may be mounted on the instrument panel of an airplane where the available space may be too limited to permit mounting a cathode ray tube indicator.

Fig. 4 shows a variation of the indicating circuit wherein a direct-current voltmeter 51 is connected across the storage capacitor 42 in place of the ammeter 41. If the voltmeter is of the type that draws no current or so little current that the capacitor 42 will hold a charge too long, the correct discharge rate may be obtained by connecting a resistor 52 of the proper value across the capacitor 42.

It should be understood that other modifications may be made in the invention if desired. For example, the time-inerval-measuring voltage appearing across the capacitor 31 may be obtained by operating the tube 24 as an ordinary amplifier tube with no spacial grid biasing, and by then keying the tube 24 by means of a multivibrator (not shown) which is triggered in one direction by the transmitted pulses 20 to hold tube 24 non-conducting and which is triggered in the other direction by the reflected pulses 22 to hold the tube 24 conducting. The resulting operation is the same as illustrated in Fig. 2 by the graphs 20, 22, 5, 6 and 7. This use of a multivibrator is described in application Serial No. 468,868, filed December 11, 1942, in the name of Thomas T. Eaton, and entitled Radio system for velocity measurement, now Patent No. 2,408,742, issued October 8, 1946.

I claim as my invention:

1. An indicator circuit for a pulse-echo distance indicating system of the type having means for transmitting periodically recurring pulses to a reflecting surface and having means for receiving the reflected pulses, said indicator circuit being for the purpose of producing an indication that is a function of the time interval between the transmission of a pulse and the reception of the pulse after reflection from said surface, said indicator circuit comprising a timing capacitor, means for charging said capacitor, a vacuum tube of the high vacuum type having a control grid, an anode and a cathode, and having its plate-cathode impedance connected across said capacitor, means for driving said tube to plate current cut-off in response to the transmission of a pulse and for holding it at cut-off until a reflected pulse is received whereby the timing capacitor receives a charge that is a function of said time interval, means responsive to the reception of a reflected pulse for driving said tube to a conducting condition and for holding it in a conducting condition until the occurrence of the next succeeding transmitted pulse whereby said timing capacitor is discharged and held in a discharged condition until the occurrence of said next succeeding transmitted pulse, a storage capacitor, a rectifier, said storage capacitor being connected across said timing capacitor through said rectifier with the rectifier connected in the direction for current flow from the timing capacitor to the storage capacitor, and an indicating device connected across said storage capacitor, said storage capacitor having a leakage path thereacross to cause a slow discharge thereof, the time constant of said storage capacitor-leakage path circuit being slow as compared with the time interval between successive transmitted pulses.

2. An indicator circuit for a pulse-echo distance indicating system of the type having means for transmitting periodically recurring pulses to a reflecting surface and having means for receiving the reflected pulses, said indicator circuit being for the purpose of producing an indication that is a function of the time interval between the transmission of a pulse and the reception of the pulse after reflection from said surface, said indicator circuit comprising a timing capacitor, means including a resistor for charging said capacitor approximately linearly during said time interval, a vacuum tube of the high vacuum type having a control grid, an anode and a cathode, and having its plate-cathode impedance connected across said capacitor, said resistor being connected to said anode for applying an operating voltage thereto, means for driving said tube to plate current cut-off in response to the transmission of a pulse and for holding it at cut-off until a reflected pulse is received whereby the timing capacitor receives a charge that is a function of said time interval, means responsive to the reception of a reflected pulse for driving said tube to a conducting condition and for holding it in a conducting condition until the occurrence of the next succeeding transmitted pulse whereby said timing capacitor is discharged and held in a discharged condition until the occurrence of said next succeeding pulse, a storage capacitor, a diode, said storage capacitor being connected across siad timing capacitor through said diode with the diode connected in the direction for current flow from the timing capacitor to the storage capacitor, and an indicating device connected across said storage capacitor, said storage capacitor having a leakage path thereacross to cause a slow discharge thereof, the time constant of said storage capacitor-leakage path circuit being slow as compared with the time interval between successive transmitted pulses.

3. An indicator circuit for a pulse-echo distance indicating system of the type having means for transmitting periodically recurring pulses to a reflecting surface and having means for receiving the reflected pulses, said indicator circuit being for the purpose of producing an indication that is a function of the time interval between the transmission of a pulse and the reception of the pulse after reflection from said surface, said indicator circuit comprising a timing capacitor, a vacuum tube having a control grid, an anode and a cathode, and having its plate-cathode impedance connected across said capacitor, an anode resistor connected to said anode through which voltage is applied thereto, means including said resistor for charging said timing capacitor approximately linearly, means for driving said tube to plate current cut-off in response to the transmission of a pulse and for holding it at cut-off until a reflected pulse is received, means responsive to the reception of a reflected pulse for driving said tube to a conducting condition and for holding it in a conducting condition until the occurrence of the next succeeding transmitted pulse, a storage capacitor, a rectifier, said storage capacitor being connected across said timing capacitor through said rectifier with the rectifier connected in the direction for current flow from the timing capacitor to the storage capacitor, and an indicating device connected across said storage capacitor, said storage capacitor having a leakage path thereacross to cause a slow discharge thereof, the time constant of said storage capacitor-leakage path circuit being slow as compared with the time interval between successive transmitted pulses.

4. An indicator circuit for a pulse-echo distance indicating system of the type having means for transmitting periodically recurring pulses to a reflecting surface and having means for receiving the reflected pulses, said indicator circuit being for the purpose of producing an indication that is a function of the time interval between the transmission of a pulse and the reception of the pulse after reflection from said surface, said indicator circuit comprising a timing capacitor, means for charging said capacitor, a vacuum tube having a control grid, an anode and a cathode, and having its plate-cathode impedance connected across said capacitor, means for applying negative pulses to said grid substantially simultaneously with the transmission of said first pulses and with sufficient amplitude and duration to drive said tube to plate current cut-off and to hold it at cut-off until a reflected pulse is received, means responsive to the reception of each of said reflected pulses for applying to said grid a positive polarity voltage of sufficient amplitude to make said tube conducting to discharge said timing capacitor and of a duration long enough so that following the occurrence of a received pulse said tube will be held conducting until the occurrence of the next succeeding transmitted pulse, a storage capacitor, a rectifier, said storage capacitor being connected across said timing capacitor through said rectifier with the rectifier connected in the direction for current flow from the timing capacitor to the storage capacitor, and an indicating device connected across said storage capacitor, said storage capacitor having a leakage path thereacross to cause a slow discharge thereof, the time constant of said storage capacitor-leakage path circuit being slow as compared with the time interval between successive transmitted pulses.

5. An indicator circuit for a pulse-echo distance indicating system of the type having means for transmitting periodically recurring pulses to a reflecting surface and having means for receiving the reflected pulses, said indicator circuit being for the purpose of producing an indication that is a function of the time which elapses between the transmission of a pulse and the reception of the pulse after reflection from said surface, said indicator circuit comprising a timing capacitor, means for charging said capacitor, a vacuum tube having a control grid, an anode and a cathode, and having its plate-cathode impedance connected across said capacitor, a grid capacitor connected between said grid and said cathode, a grid resistor connected across said grid capacitor, a first diode, means for applying negative pulses through said first diode to said grid substantially simultaneously with the transmission of said first pulses and with sufficient amplitude to drive said tube beyond plate current cut-off, a second diode, means for applying said received reflected pulses through said second diode to said grid with positive polarity and with sufficient amplitude to make said tube conducting to discharge said timing capacitor, the time constant of said grid capacitor-grid resistor circuit being long enough so that following the occurrence of one of said negative pulses said tube will be held biased beyond cut-off until the occurrence of the next succeeding negative pulse in the absence of a received pulse, a storage capacitor, a third diode, said storage capacitor being connected across said timing capacitor through said third diode with the third diode connected in the direction for current flow from the timing capacitor to the storage capacitor, and an indicating device connected across said storage capacitor, said storage capacitor having a leakage path thereacross to cause a slow discharge thereof, the time constant of said storage capacitor-leakage path circuit being slow as compared with the time interval between successive transmitted pulses.

JOHN EVANS.

REFERENCES CITED

The following references are of record in the file of this patent:

UNITED STATES PATENTS

| Number | Name | Date |
| --- | --- | --- |
| 2,009,459 | Turner | July 30, 1935 |
| 2,055,883 | Terry | Sept. 29, 1936 |
| 2,307,316 | Wolff | Jan. 5, 1943 |

FOREIGN PATENTS

| Number | Country | Date |
| --- | --- | --- |
| 469,417 | Great Britain | July 26, 1937 |

OTHER REFERENCES

Review of Scientific Instruments, December, 1937, vol. 8, pp. 502–504, "Electronic circuits for the measurement of time and speed" by Reich et al. Copy in Patent Office Library.